(12) United States Patent
Banks et al.

(10) Patent No.: US 10,965,186 B2
(45) Date of Patent: Mar. 30, 2021

(54) DRUM BRAKE CONCEPT FOR USE WITH AN ELECTRIC WHEEL END DRIVE MOTOR

(71) Applicant: Bendix Commercial Vehicle Systems LLC, Elyria, OH (US)

(72) Inventors: Daniel E Banks, Climax, MI (US); Fred W Berwanger, Edwardsburg, MI (US); Ronald S Plantan, Mooresville, NC (US); Manouchehr Sabeti, Avon, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 191 days.

(21) Appl. No.: 16/051,628

(22) Filed: Aug. 1, 2018

(65) Prior Publication Data
US 2020/0044514 A1   Feb. 6, 2020

(51) Int. Cl.
| | | |
|---|---|---|
| *B60K 7/00* | (2006.01) | |
| *H02K 7/102* | (2006.01) | |
| *F16D 65/08* | (2006.01) | |
| *F16D 51/00* | (2006.01) | |
| *F16D 65/827* | (2006.01) | |
| *B60K 1/00* | (2006.01) | |

(52) U.S. Cl.
CPC .......... *H02K 7/102* (2013.01); *B60K 7/0007* (2013.01); *F16D 51/00* (2013.01); *F16D 65/08* (2013.01); *B60K 2001/006* (2013.01); *B60K 2007/0092* (2013.01); *B60L 2220/44* (2013.01); *F16D 65/827* (2013.01)

(58) Field of Classification Search
CPC ................................................. B60B 27/0057
See application file for complete search history.

(56) References Cited

U.S. PATENT DOCUMENTS

| | | | |
|---|---|---|---|
| 1,167,284 A | 1/1916 | Flickinger | |
| 1,875,434 A | 9/1932 | Frankland | |
| 2,265,241 A | 12/1941 | Albert | |
| 2,267,225 A | 12/1941 | Weeks | |
| 2,289,166 A | 7/1942 | Ash | |
| 2,497,031 A | 2/1950 | Macpherson | |
| 2,506,146 A * | 5/1950 | Gladish | B60K 17/145 310/67 R |
| 2,542,455 A | 2/1951 | Ash | |
| 3,810,678 A | 5/1974 | Studdard | |

(Continued)

FOREIGN PATENT DOCUMENTS

| | | |
|---|---|---|
| CN | 102801246 A | 11/2012 |
| KR | 20130064642 A | 6/2013 |

*Primary Examiner* — Nicholas J Lane
(74) *Attorney, Agent, or Firm* — Cheryl Greenly; Brian Kondas; Eugene Clair

(57) ABSTRACT

A drum brake apparatus is provided for a vehicle air braking system. The drum brake apparatus comprises a wheel drum having a first interior chamber. The drum brake apparatus also comprises a drum brake assembly disposed in the first interior chamber of the wheel drum and mounted on inboard side of the wheel drum. The drum apparatus further comprises a brake drum adapter mounted on outboard side of the wheel drum and providing a second interior chamber in which an electric drive motor can be disposed. The drum brake apparatus also comprises a wheel hub disposed in the second interior chamber of the brake drum adapter and to which a wheel rim can be mounted.

12 Claims, 10 Drawing Sheets

(56) References Cited

U.S. PATENT DOCUMENTS

| | | | | |
|---|---|---|---|---|
| 4,913,258 A * | 4/1990 | Sakurai | ............ | B60K 17/30 |
| | | | | 180/242 |
| 5,025,898 A | 6/1991 | Hsiao | | |
| 5,740,891 A | 4/1998 | Song | | |
| 6,328,123 B1 * | 12/2001 | Niemann | ............ | F16D 55/40 |
| | | | | 180/65.51 |
| 7,249,644 B2 | 7/2007 | Honda | | |
| 8,459,386 B2 * | 6/2013 | Pickholz | ............ | B60L 15/00 |
| | | | | 180/65.51 |
| 8,556,012 B2 * | 10/2013 | Kim | ............ | F16D 51/00 |
| | | | | 180/65.51 |
| 2006/0087182 A1 * | 4/2006 | Sugiyama | ............ | B60K 7/0007 |
| | | | | 310/75 C |
| 2007/0257570 A1 * | 11/2007 | Walter | ............ | B60K 17/046 |
| | | | | 310/67 R |
| 2009/0032321 A1 * | 2/2009 | Marsh | ............ | B60L 50/16 |
| | | | | 180/65.51 |
| 2009/0065313 A1 * | 3/2009 | Levering | ............ | F16D 65/827 |
| | | | | 188/218 R |
| 2012/0292978 A1 * | 11/2012 | Buschjohann | ............ | B60G 21/051 |
| | | | | 301/6.5 |
| 2014/0203624 A1 * | 7/2014 | Hilton | ............ | B60L 7/26 |
| | | | | 303/3 |
| 2015/0108823 A1 * | 4/2015 | Figuered | ............ | B60K 17/356 |
| | | | | 301/6.4 |
| 2016/0121709 A1 * | 5/2016 | Shin | ............ | B60K 7/0007 |
| | | | | 301/6.5 |
| 2019/0383340 A1 * | 12/2019 | Seaman | ............ | H02K 9/02 |

* cited by examiner

DRUM BRAKE CONCEPT FOR USE WITH AN ELECTRIC WHEEL END DRIVE MOTOR

BACKGROUND

The present application relates to vehicle air braking systems, and is particularly directed to a drum brake apparatus for a vehicle air braking system, such as a heavy vehicle air braking system that includes a drum brake assembly, and a method of assembling the same.

A typical drum brake assembly includes a brake shoe that engages a wheel drum to transmit brake torque through a brake spider to a wheel axle. One end of the brake shoe is pivotable against an anchor pin that is attached to one side of the brake spider. A cam follower roller is disposed at the other end of the brake shoe. When a service brake application occurs, a camshaft located on the side of the brake spider opposite the anchor pin is actuated to rotate about its longitudinal central axis. As the camshaft rotates about its longitudinal central axis, a cam surface of an S-cam mounted on the camshaft acts against the cam follower roller to pivot the brake shoe about the anchor pin. As the brake shoe pivots about the anchor pin, the lining of the brake shoe frictionally engages the wheel drum to transmit brake torque through the brake spider to the wheel axle and thereby to decelerate and brake the vehicle.

Some drum brake assemblies are equipped with an electric wheel end drive motor. The electric wheel end drive motor functions both to propel the vehicle and to generate brake torque to assist in decelerating and braking the vehicle when needed. Accordingly, those skilled in the art continue with research and development efforts in drum brake assemblies including drum brake assemblies with electric wheel end drive motors.

SUMMARY

In accordance with one example embodiment, a drum brake apparatus is provided for a vehicle air braking system. The drum brake apparatus comprises a wheel drum having a first interior chamber. The drum brake apparatus also comprises a drum brake assembly disposed in the first interior chamber of the wheel drum and mounted on inboard side of the wheel drum. The drum apparatus further comprises a brake drum adapter mounted on outboard side of the wheel drum and providing a second interior chamber in which an electric drive motor can be disposed. The drum brake apparatus also comprises a wheel hub disposed in the second interior chamber of the brake drum adapter and to which a wheel rim can be mounted.

In accordance with another example embodiment, a drum brake apparatus is provided for a vehicle air braking system having an electric drive motor. The drum brake apparatus comprises a wheel drum. The drum brake apparatus also comprises a brake drum adapter coupled with the wheel drum and cooperating with the wheel drum to form a structure that can house the electric drive motor.

In accordance with another example embodiment, an assembly method is provided for a vehicle having an axle assembly. The assembly method comprises fastening a drum brake to a brake flange of the axle assembly, coupling an electric drive motor to an axle of the axle assembly, and routing electrical lines through a brake spider and the brake flange of the axle assembly. The assembly method also comprises attaching the electrical lines to the electric drive motor, coupling a wheel hub to a spindle of the axle assembly, and coupling a combined structure of a brake drum portion and a brake drum adapter portion between the drum brake and the wheel hub. The assembly method further comprises mounting a wheel rim on wheel studs of the wheel hub and against one end of the brake drum adapter of the combined structure.

In accordance with another example embodiment, a drum brake apparatus is provided for a vehicle air braking system. The drum brake apparatus comprises a brake drum adapter for providing an interface between a wheel drum and a wheel hub and housing one or more brake components associated with the vehicle air braking system. The brake drum adapter has a plurality of vent openings through which air can flow to cool a brake component housed within the brake drum adapter.

In accordance with another example embodiment, an apparatus is connectable with an electric wheel end drive motor. The apparatus comprises a wheel axle. The apparatus also comprises a brake spider having an inboard side and an outboard side and mounted on a portion of the wheel axle. The apparatus further comprises a brake flange having an inboard side and an outboard side and mounted on another portion of the wheel axle on the inboard side of the brake spider. The brake spider and the brake flange have aligned passages through which electrical lines can enter from the inboard side of the brake flange and exit from the outboard side of the brake spider so that the electrical lines can interface with the electric wheel end drive motor.

In accordance with another example embodiment, a drum brake apparatus is provided for a vehicle air braking system having an electric drive motor. The drum brake apparatus comprises a wheel hub supporting the electric drive motor. The drum brake apparatus also comprises means for surrounding at least a portion of the wheel hub and the electric drive motor to protect the wheel hub and the electric drive motor.

DETAILED DESCRIPTION

Figure 1:
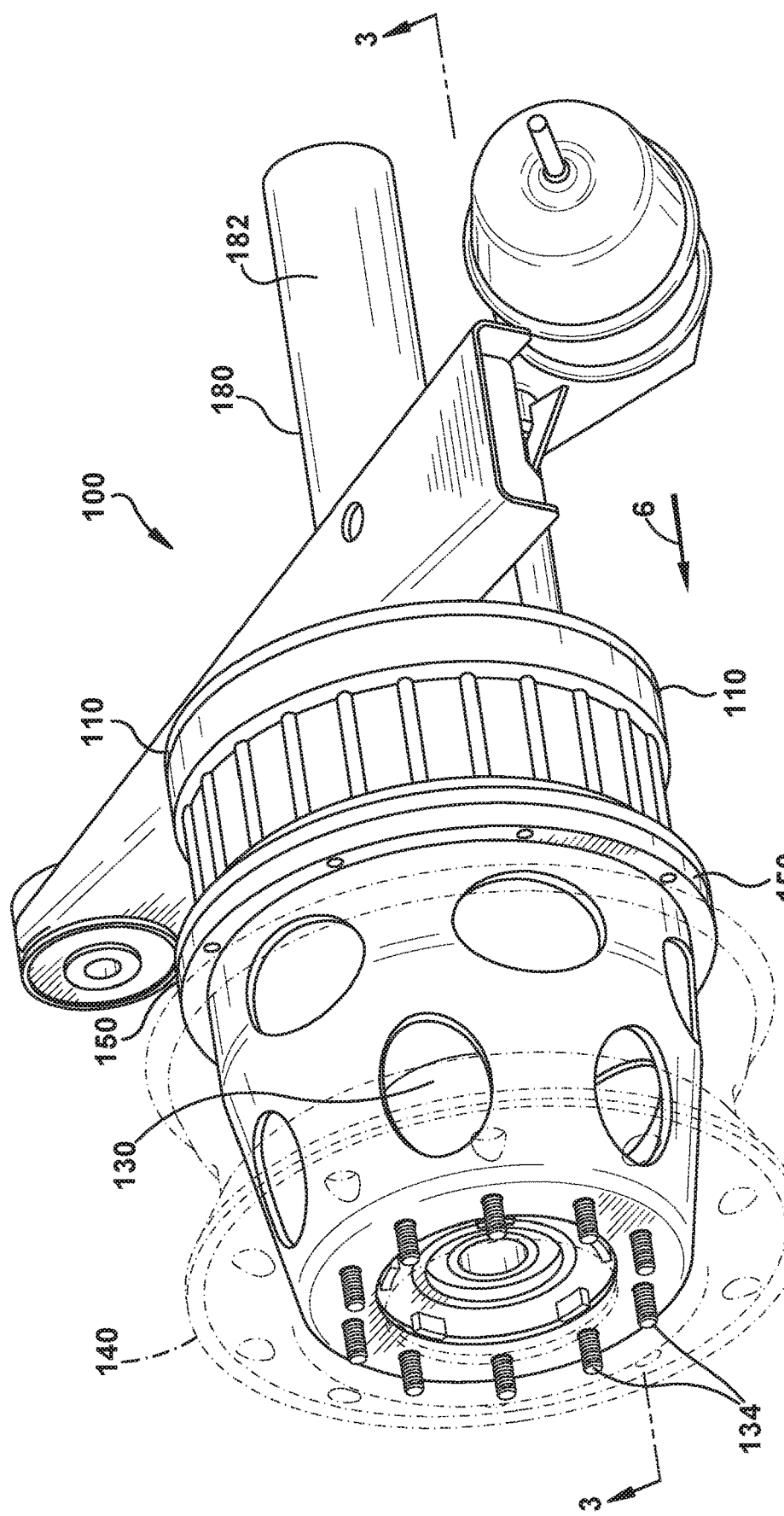
FIG. 1 is a perspective view of an example drum brake apparatus including a brake drum adapter constructed in accordance with an embodiment.
Figure 2:
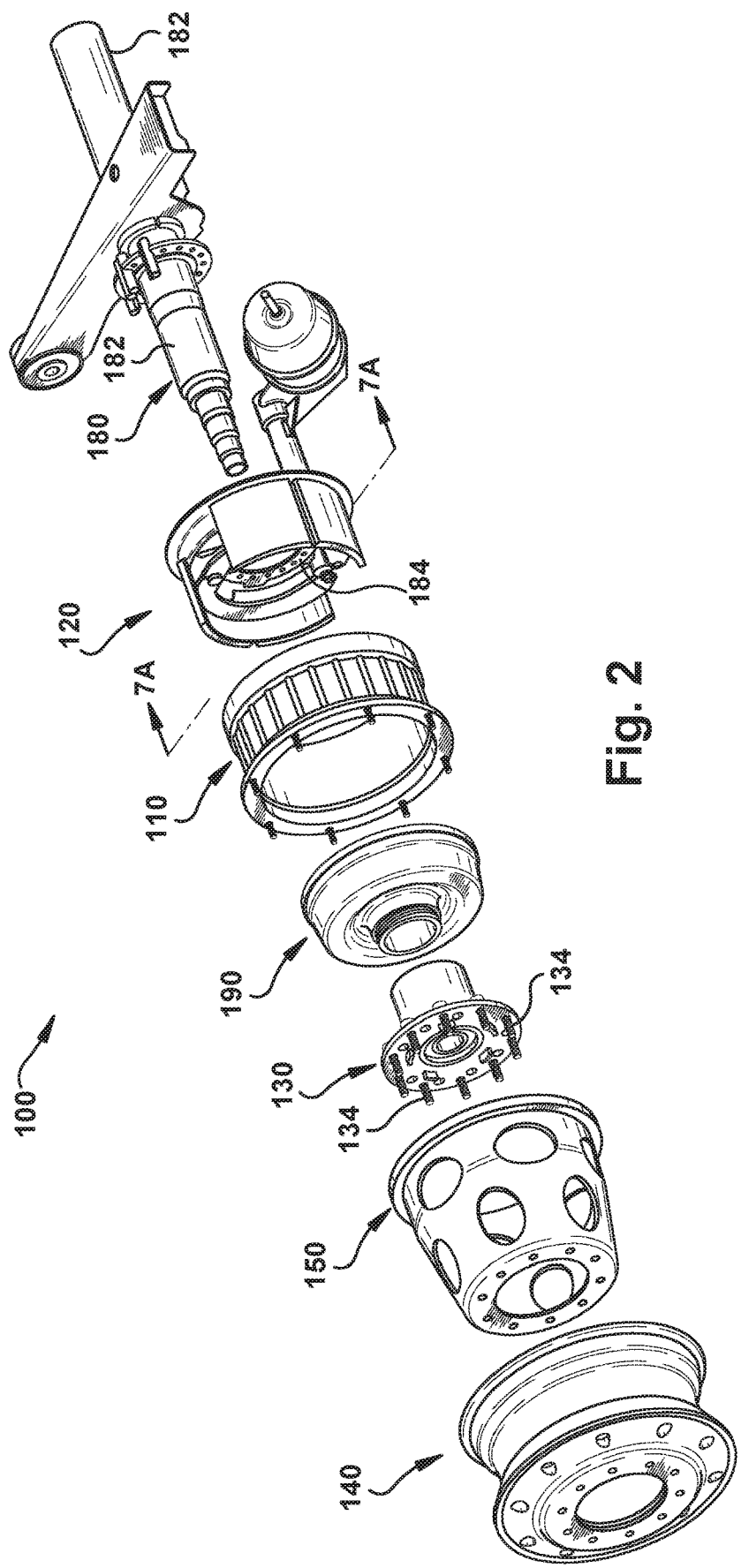
FIG. 2 is an exploded view of components including the brake drum adapter of the drum brake apparatus of FIG. 1

Referring to FIG. 1, a perspective view of an example drum brake apparatus 100 including a brake drum adapter 150 constructed in accordance with an embodiment. FIG. 2 is an exploded view of components including the brake drum adapter 150 of the drum brake apparatus 100 of FIG. 1.

The drum brake apparatus 100 comprises a wheel drum 110, and a drum brake assembly 120 mounted on inboard side (i.e., the inboard side of the vehicle) of the wheel drum 110. The drum brake apparatus 100 also comprises a wheel hub 130 disposed on outboard side of the wheel drum 110, and to which a wheel rim 140 can be mounted. The wheel hub 130 has a number of wheel studs 134.

A brake spider 184 is disposed on inboard side of the drum brake assembly 120. The brake spider 184 faces an axle assembly 180 having a wheel axle 182 and a brake flange 186 mounted on a portion of the wheel axle 182. The brake spider 184 is mounted on another portion of the wheel axle 182.

The drum brake apparatus 100 further comprises the brake drum adapter 150 which is mounted on outboard side of the wheel drum 110. The brake drum adapter 150 is coupled with the wheel drum 110 and cooperates with the wheel drum 110 to form a structure that can house an electric wheel end drive motor 190 for providing driving force and brake torque when needed. The electric drive motor 190 may comprise any electric drive motor. The brake drum adapter 150 is coupled to the wheel drum 110 using a suitable fastening mechanism, such as threaded studs and nuts for example. Other types of fastening mechanisms are possible.

Figure 3:
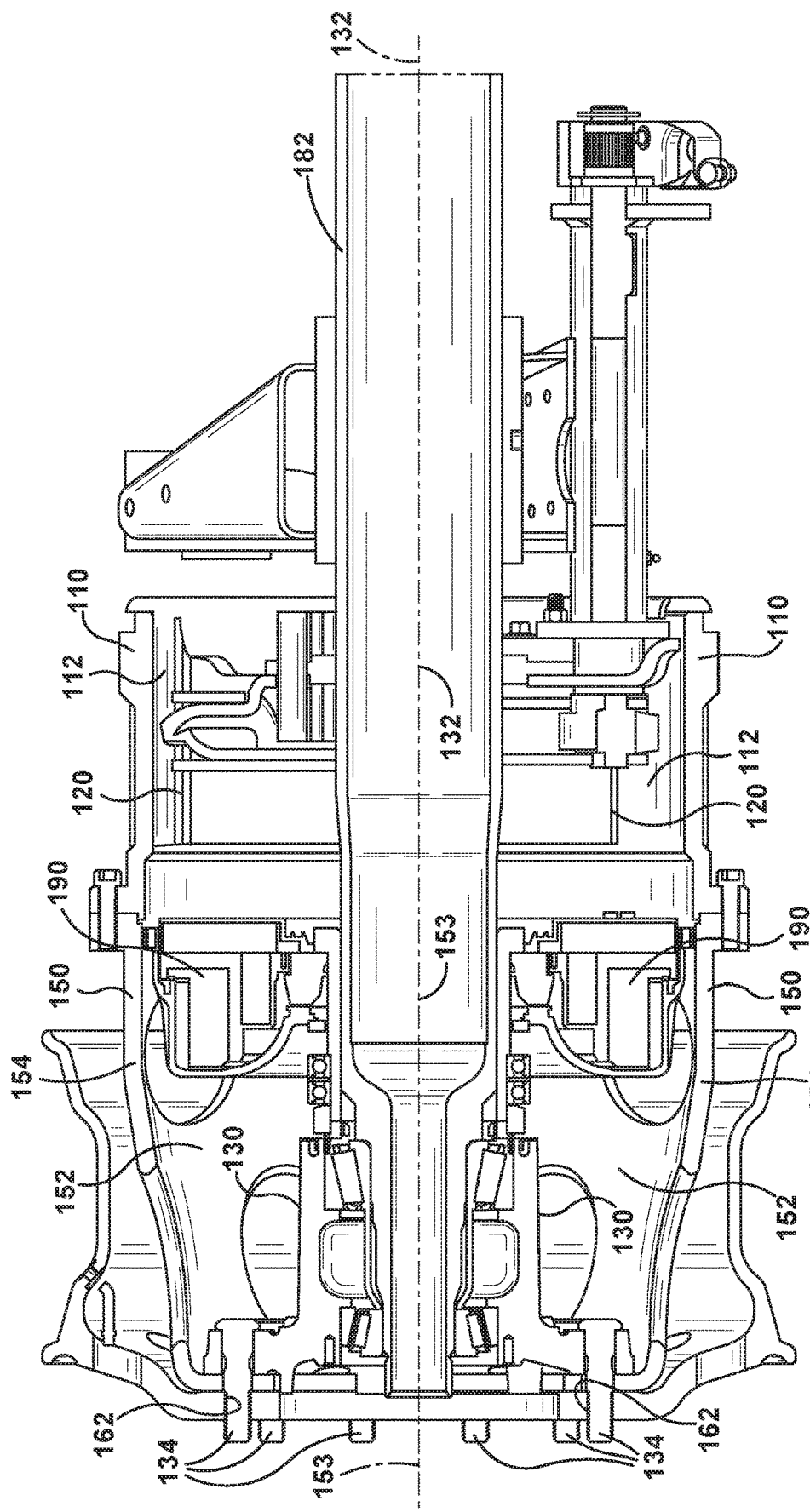
FIG. 3 is a sectional view looking approximately along line 3-3 shown in FIG. 1.

Referring to FIG. 3, a sectional view looking approximately along line 3-3 shown in FIG. 1 is illustrated. The wheel drum 110 has a first interior chamber 112. The drum brake assembly 120 is disposed in the first interior chamber 112 of the wheel drum 110. The brake drum adapter 150 defines a second interior chamber 152 that is in communication with the first interior chamber 112. The wheel hub 130 is disposed in the second interior chamber 152 of the brake drum adapter 150. The electric drive motor 190 is also disposed in the second interior chamber 152 of the brake drum adapter 150.

More specifically, the electric drive motor 190 is disposed on inboard side of the second interior chamber 152 of the brake drum adapter 150. The wheel hub 130 is disposed on outboard side of the second interior chamber 152 of the brake drum adapter 150. The wheel drum 110 comprises cast iron material, and the brake drum adapter 150 comprises cast aluminum material. It is conceivable that the wheel drum 110 may comprise a different material, and that the brake drum adapter 150 may comprise a different material. The wheel drum 110 has a longitudinal central axis 132. The brake drum adapter 150 has a longitudinal central axis 153 that is concentric with the longitudinal central axis 132 of the wheel drum 110.

Figure 4:
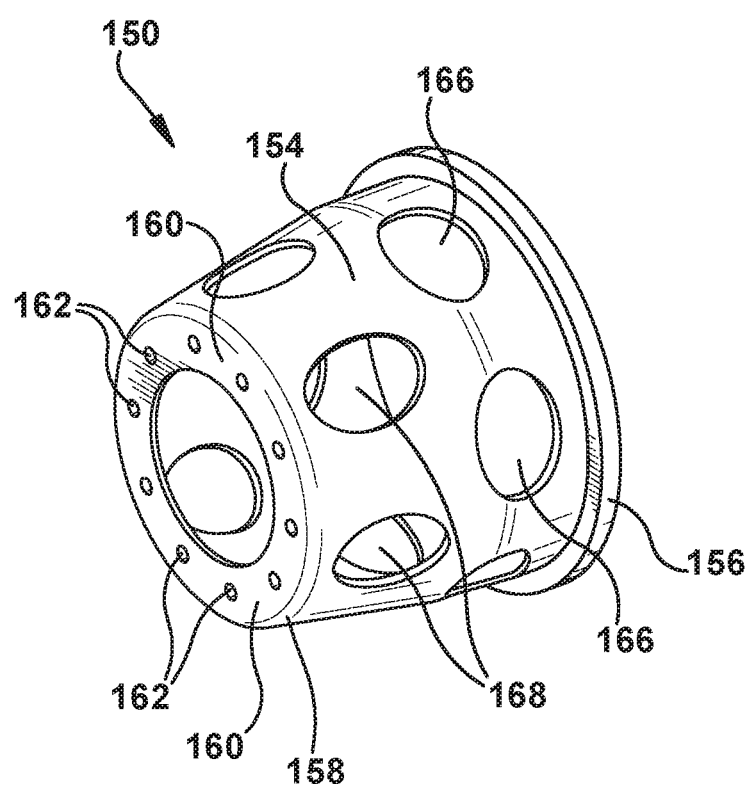
FIG. 4 is an enlarged view of the brake drum adapter shown in FIG. 2.

Referring to FIG. 4, an enlarged view of the brake drum adapter 150 of FIG. 2 is shown. The brake drum adapter 150 includes a tapered circumferential surface 154 that extends between a larger radius edge 156 on inboard side of the brake drum adapter 150 and a smaller radius edge 158 on outboard side of the brake drum adapter 150 to form a substantially frustoconical shape of the brake drum adapter 150. The brake drum adapter 150 includes an end surface 160 disposed at the smaller radius edge 158. The end surface 160 has a number of holes 162 that receive the wheel studs 134 of the wheel hub 130 (see FIG. 3).

The tapered circumferential surface 154 has a plurality of vent openings through which air can pass to cool the electric drive motor 190. The plurality of vent openings includes a first set 166 of oval-shaped openings adjacent to the larger radius edge 156, and a second set 168 of oval-shaped openings adjacent to the smaller radius edge 158. The shape and size of the first set 166 of oval-shaped openings and the shape and size of the second set 168 of oval-shaped openings may vary. The first set 166 of oval-shaped openings and the second set 168 of oval-shaped openings alternate along the circumferential extent of the brake drum adapter 150. The first set 166 of oval-shaped openings are oval along the circumferential extent of the brake drum adapter 150, and the second set 168 of oval-shaped openings are oval along the longitudinal extent of the brake drum adapter 150. Accordingly, the first set 166 of openings and the second set 168 of openings are transverse to each other.

Figure 4A:
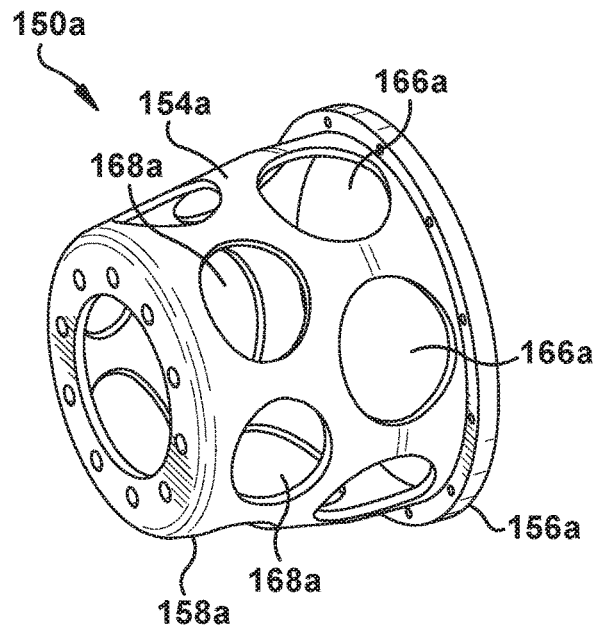
FIG. 4A is a perspective view similar to FIG. 4, and showing a brake drum adapter constructed in accordance with another embodiment.

Referring to each of FIGS. 4A, 4B, 4C, and 4D, a perspective view of a brake drum adapter constructed in accordance with another embodiment is illustrated. As shown in FIG. 4A, a brake drum adapter 150a includes a tapered circumferential surface 154a that has a plurality of vent openings. The plurality of vent openings includes a first set 166a of oval-shaped openings adjacent to a larger radius edge 156a of the brake drum adapter 150a, and a second set 168a of oval-shaped openings adjacent to a smaller radius edge 158a of the brake drum adapter 150a. The shape and size of the first set 166a of oval-shaped openings and the shape and size of the second set 168a of oval-shaped openings may vary. The first set 166a of oval-shaped openings are oval along the circumferential extent of the brake drum adapter 150a, and the second set 168a of oval-shaped openings are also oval along the circumferential extent of the brake drum adapter 150a. Accordingly, the first set 166a of openings and the second set 168a of openings are parallel to each other around the circumferential extent of the brake drum adapter 150a.

Figure 4C:
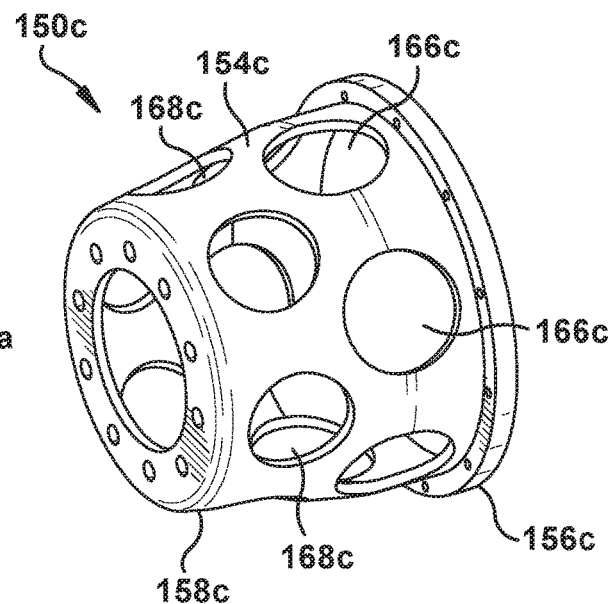
FIG. 4C is a perspective view similar to FIG. 4, and showing a brake drum adapter constructed in accordance with another embodiment.
Figure 4B:
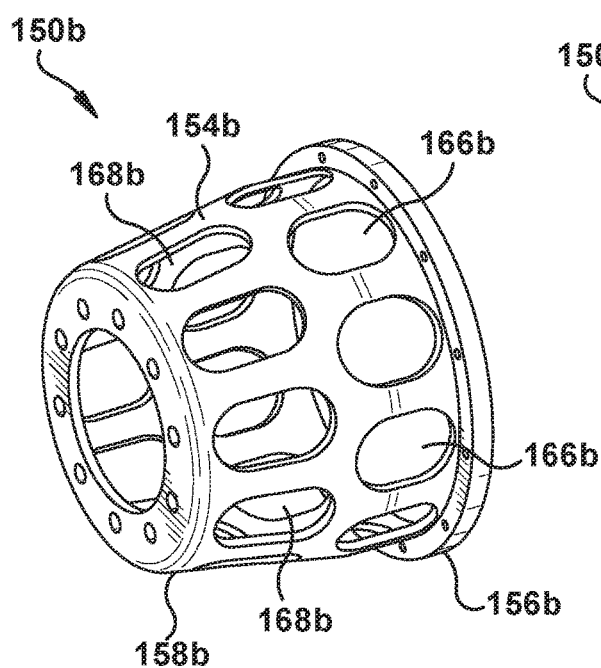
FIG. 4B is a perspective view similar to FIG. 4, and showing a brake drum adapter constructed in accordance with another embodiment.

As shown in FIG. 4B, a brake drum adapter 150b includes a tapered circumferential surface 154b that has a plurality of vent openings. The plurality of vent openings includes a first set 166b of oval-shaped openings adjacent to a larger radius edge 156b of the brake drum adapter 150b, and a second set 168b of oval-shaped openings adjacent to a smaller radius edge 158b of the brake drum adapter 150b. The shape and size of the first set 166b of oval-shaped openings and the shape and size of the second set 168b of oval-shaped openings may vary. The first set 166b of oval-shaped openings and the second set 168c of oval-shaped openings alternate along the circumferential extent of the brake drum adapter 150b. The first set 166b of oval-shaped openings are oval along the longitudinal extent of the brake drum adapter 150b, and the second set 168b of oval-shaped openings are also oval along the longitudinal extent of the brake drum adapter 150b. Accordingly, the first set 166b of openings and the second set 168b of openings are parallel to each other along the longitudinal extent of the brake drum adapter 150b.

As shown in FIG. 4C, a brake drum adapter 150c includes a tapered circumferential surface 154c that has a plurality of vent openings. The plurality of vent openings includes a first set 166c of circular-shaped openings adjacent to a larger radius edge 156c of the brake drum adapter 150c, and a second set 168c of circular-shaped openings adjacent to a smaller radius edge 158c of the brake drum adapter 150b. The shape and size of the first set 166c of circular-shaped openings and the shape and size of the second set 168c of circular-shaped openings may vary. The first set 166c of circular-shaped openings and the second set 168b of circular-shaped openings alternate along the circumferential extent of the brake drum adapter 150c.

Figure 4D:
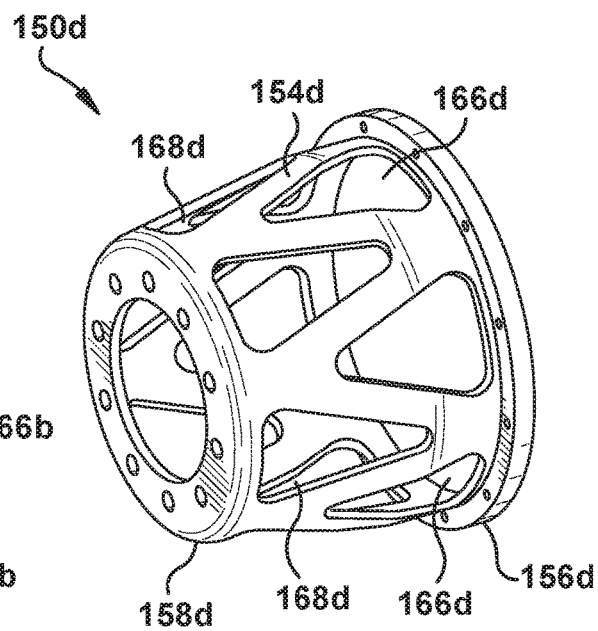
FIG. 4D is a perspective view similar to FIG. 4, and showing a brake drum adapter constructed in accordance with another embodiment.

As shown in FIG. 4D, a brake drum adapter 150d includes a tapered circumferential surface 154d that has a plurality of vent openings. The plurality of vent openings includes a first set 166d of triangular-shaped openings adjacent to a larger radius edge 156d of the brake drum adapter 150d, and a second set 168d of triangular-shaped openings adjacent to a smaller radius edge 158d of the brake drum adapter 150d. The shape and size of the first set 166d of triangular-shaped openings and the shape and size of the second set 168d of triangular-shaped openings may vary. The first set 166d of triangular-shaped openings and the second set 168d of triangular-shaped openings alternate along the circumferential extent of the brake drum adapter 150d. The first set 166d of triangular-shaped openings "point" toward the outboard side of the vehicle, and the second set 168d of triangular-shaped openings "point" toward the inboard side of the vehicle.

Figure 5A:
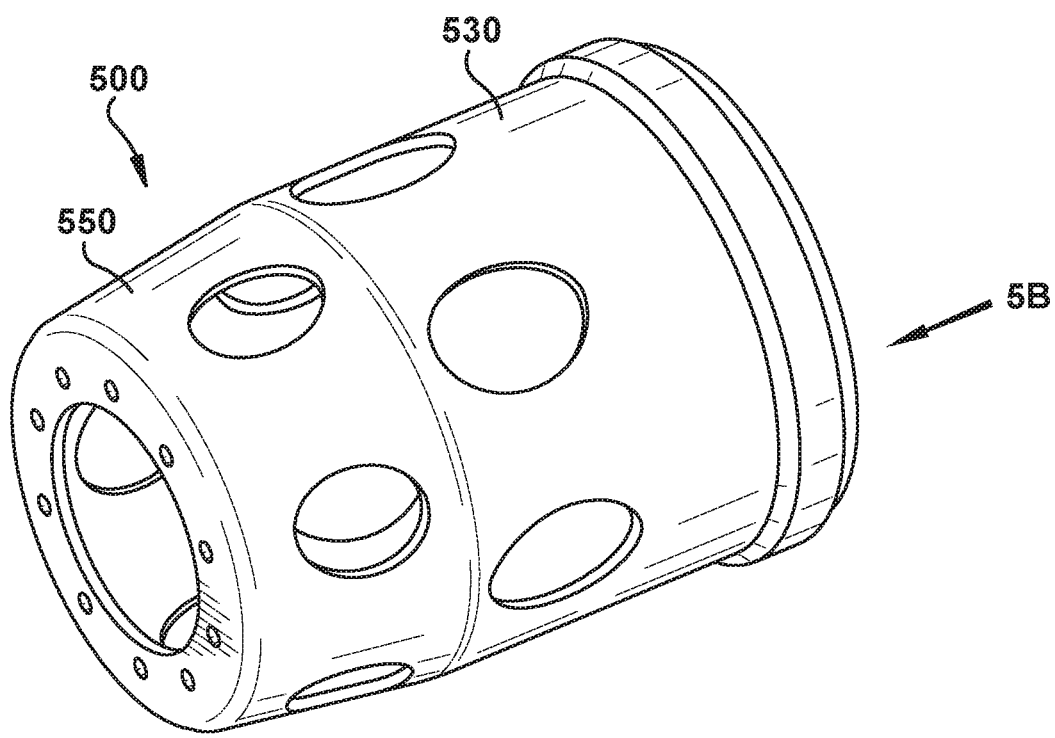
FIG. 5A is a perspective view of an elongated brake drum without adapter constructed in accordance with an embodiment.
Figure 5B:
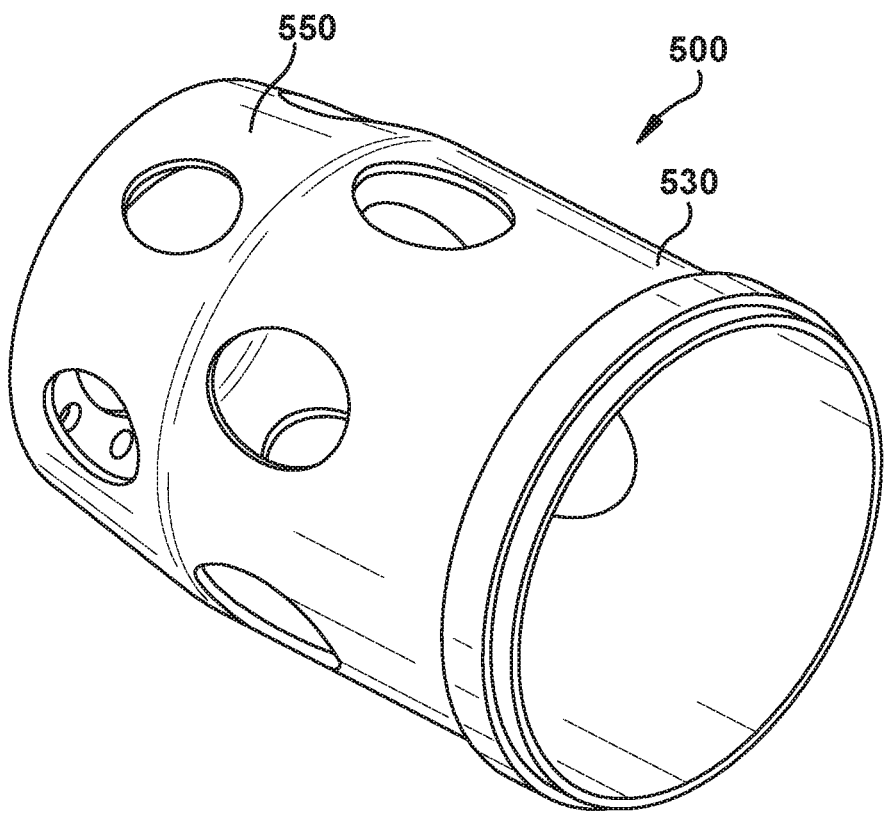
FIG. 5B is a perspective view looking approximately in the direction of arrow "5B" shown FIG. 5A.

Referring to FIG. 5A, a perspective view of an elongated brake drum without adapter 500 constructed in accordance with an embodiment is illustrated. FIG. 5B is a perspective view looking approximately in the direction of arrow "5B" shown FIG. 5A. The elongated brake drum without adapter 500 comprises an integrated, single piece of cast iron material. It is conceivable that the elongated brake drum without adapter 500 comprise a different material.

The elongated brake drum without adapter 500 includes a brake drum portion 530 and a brake drum adapter portion 550. The elongated brake drum without adapter 500 of FIGS. 5A and 5B has the functionality of the brake drum 130 and the functionality of the brake drum adapter 150 of FIGS. 1-4 described hereinabove.

Figure 6:
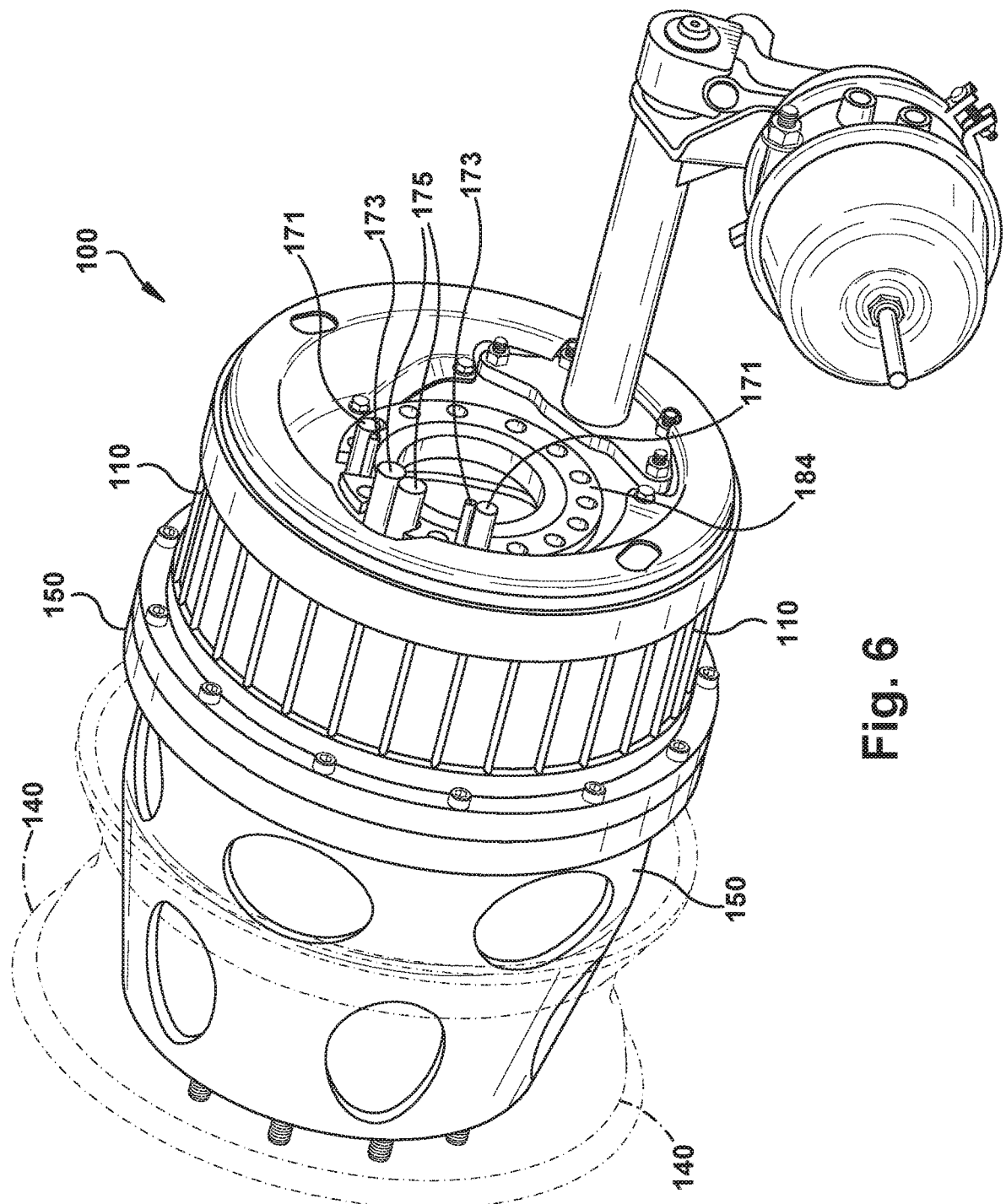
FIG. 6 is a perspective view looking approximately in the direction of arrow "6" shown in FIG. 1.
Figure 7A:
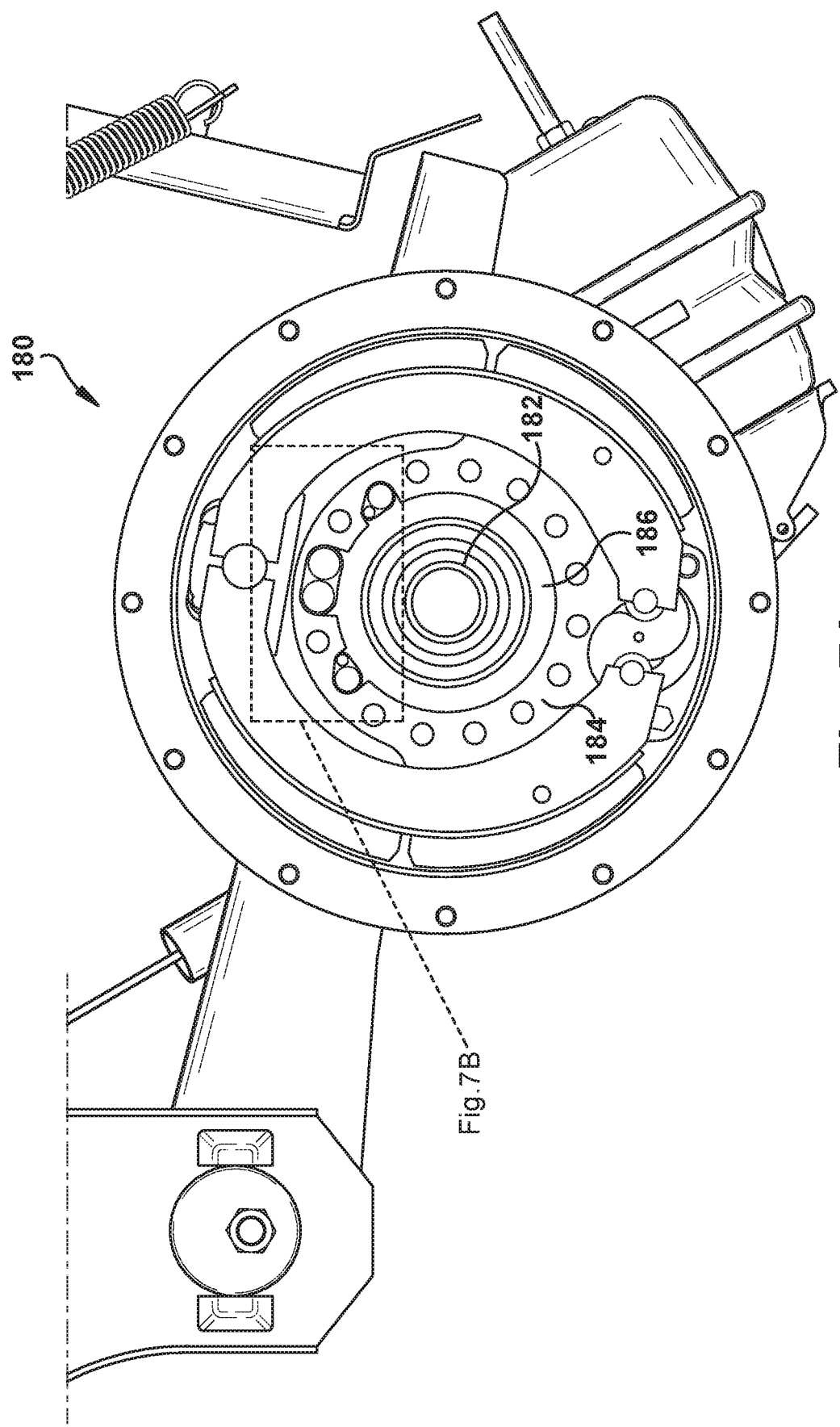
FIG. 7A is an elevational view looking approximately along line 7A-7A shown in FIG. 2.
Figure 7B:
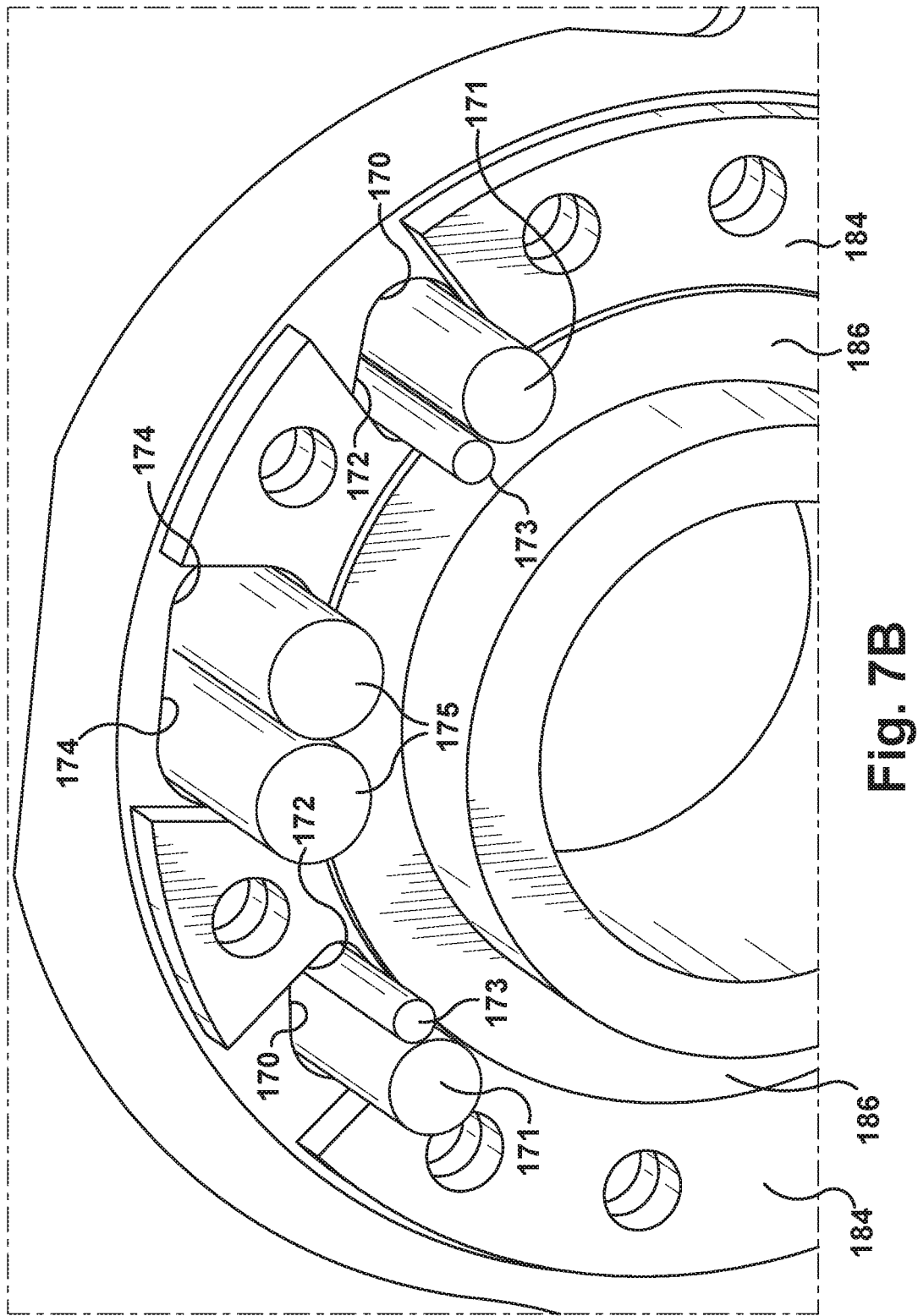
FIG. 7B is a perspective view of an enlarged portion of FIG. 7A, which is designated with rectangle "7B" in FIG. 7A.

Referring to FIG. 6, a perspective view looking approximately in the direction of arrow "6" shown in FIG. 1 is illustrated. FIG. 7A is an elevational view looking approximately along line 7A-7A shown in FIG. 2. FIG. 7B is a perspective view of an enlarged portion of FIG. 7A, which is designated with rectangle "7B" in FIG. 7A. The brake spider 184 and the brake flange 186 have aligned passages through which coolant lines and electrical lines can enter from the inboard side of the brake flange 186 and exit from the outboard side of the brake spider 184 so that the coolant lines and electrical lines can interface with the electric drive motor 190.

More specifically, as best shown in FIG. 7B, the brake spider 184 and the brake flange 186 have a number of aligned passages through which coolant lines can enter from the inboard side of the brake flange 186 and exit from the outboard side of the brake spider 184 so that the coolant lines can interface with the electric drive motor 190. The brake spider 184 and the brake flange 186 have (i) a first pair 170 of aligned passages through which coolant lines 171 can enter from the inboard side of the brake flange 186 and exit from the outboard side of the brake spider 184, (ii) a second pair 172 of aligned passages through which electrical control lines 173 can enter from the inboard side of the brake flange 186 and exit from the outboard side of the brake spider 184, and (iii) a third pair 174 of aligned passages through which electrical power lines 175 can enter from the inboard side of the brake flange 186 and exit from the outboard side of the brake spider 184. The second pair 172 of aligned passages lie substantially between the first pair 170 of aligned passages, and the third pair 174 of aligned passages lie substantially between the second pair 172 of aligned passages.

Figure 8:
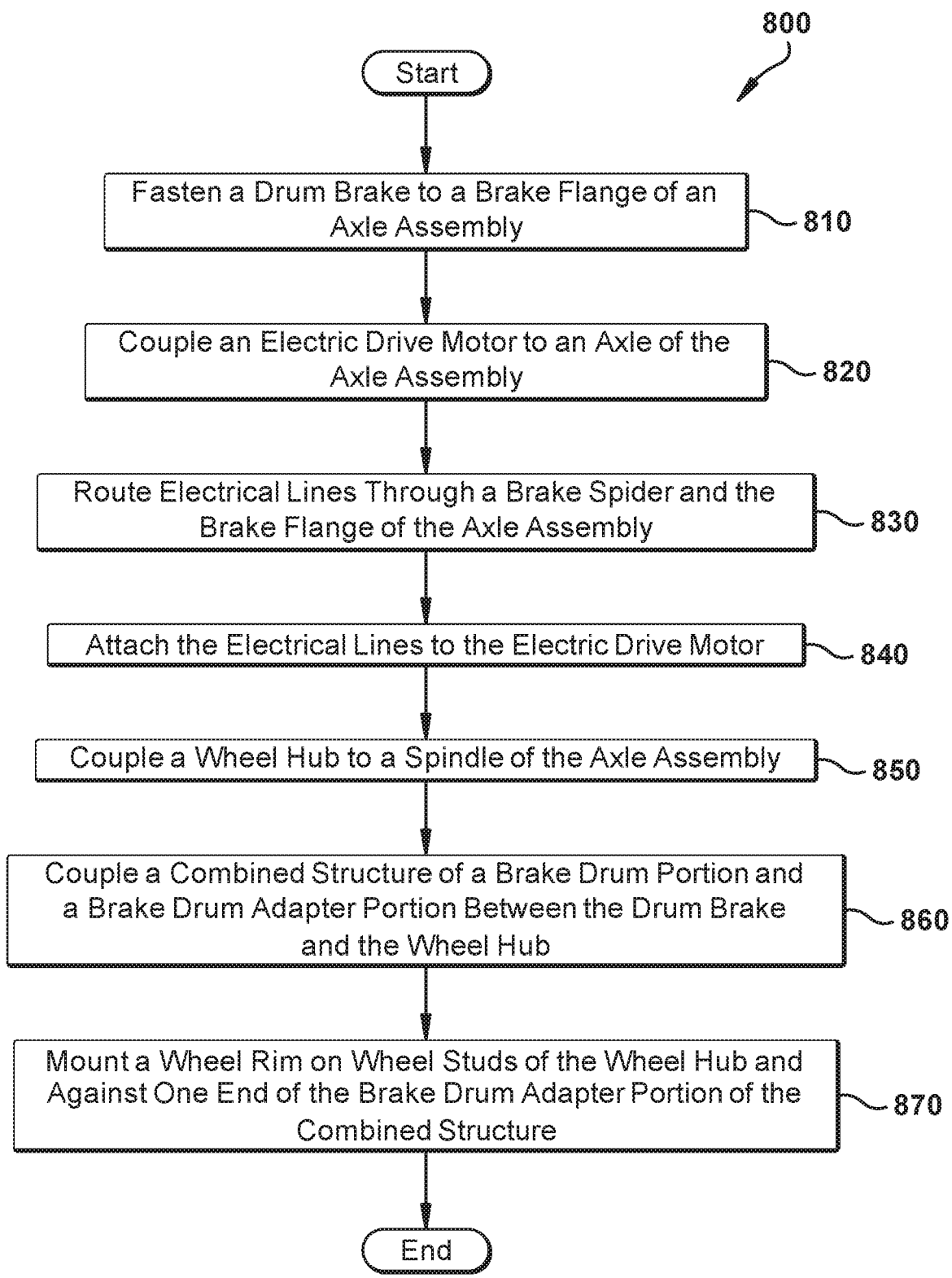
FIG. 8 is a flow diagram depicting an example method of assembling the drum brake apparatus of FIG. 1.

Referring to FIG. 8, a flow diagram 800 depicting an example method of assembling the drum brake apparatus 100 of FIG. 1 is illustrated. In block 810, a drum brake is fastened to a brake flange of an axle assembly. The process proceeds to block 820 in which an electric drive motor is coupled to an axle of the axle assembly. Then in block 830, electrical lines are routed through a brake spider and a brake flange of the axle assembly. In block 840, the electrical lines are attached to the electric drive motor. The electrical lines include a number of power lines and a number of control lines. Then the process proceeds to block 850.

In block 850, a wheel hub is coupled to a spindle of the axle assembly. Then in block 860, a combined structure of a brake drum portion and a brake drum adapter portion is coupled between the drum brake and the wheel hub. The process then proceeds to block 870 in which a wheel rim is mounted on wheel studs of the wheel hub and against one end of the brake drum adapter of the combined structure. The process then ends.

In some embodiments, the assembly method further comprises routing coolant lines through the brake spider and the brake flange of the axle assembly, and attaching the coolant lines to the electric drive motor.

In some embodiments, routing electrical lines and routing coolant lines includes routing a pair of coolant lines, a pair of electrical control lines substantially between the pair of coolant lines, and a pair of electric power lines substantially between the pair of electrical control lines through the brake spider and the brake flange of the axle assembly.

In some embodiments, coupling a combined structure of a brake drum portion and a brake drum adapter portion between the drum brake and the wheel hub includes positioning the brake drum portion around the drum brake and positioning the brake drum adapter portion around the wheel hub.

In some embodiments, the assembly method further comprises fastening the brake drum portion and the brake drum adapter portion together before the combined structure is coupled between the drum brake and the wheel hub.

In some embodiments, fastening the brake drum portion and the brake drum adapter portion together before the combined structure is coupled between the drum brake and the wheel hub includes fastening the brake drum portion made of cast iron material and the brake drum adapter portion made of aluminum material together before the combined structure is coupled between the drum brake and the wheel hub.

In some embodiments, coupling a combined structure of a brake drum portion and a brake drum adapter portion between the drum brake and the wheel hub includes coupling the brake drum portion and the brake drum adapter portion as an integrated, single piece of cast iron material between the drum brake and the wheel hub.

It should be apparent that the brake drum adapter 150 provides an interface between the wheel drum 110 and the wheel hub 130 and houses one or more brake components associated with the vehicle air braking system. The brake drum adapter 150 not only protects the wheel hub 130 and the electric drive motor 190 by providing a structure that surrounds at least a portion of the wheel hub 130 and the electric drive motor 190, but also has the plurality of vent openings 166, 168 through which air can flow to cool a brake component housed in a chamber defined within the brake drum adapter 150.

It should also be apparent that a drum brake apparatus constructed in accordance with the above-described example embodiment combines the advantages of a brake drum adapter made of cast aluminum material and a brake drum made of cast iron material.

It should further be apparent that a drum brake apparatus constructed in accordance with the above-described example embodiments is relatively easy to fabricate and assemble. The drum brake apparatus can be installed in retrofit applications as well as new production applications.

Although the above description describes the drum brake apparatus 100 being used in a heavy vehicle such as a truck, it is conceivable that the drum brake apparatus 100 may be used in other types of commercial vehicles, such as busses for example.

While the present disclosure has been illustrated by the description of example processes and system components, and while the various processes and components have been described in detail, applicant does not intend to restrict or in any way limit the scope of the appended claims to such detail. Additional modifications will also readily appear to those skilled in the art. The disclosure in its broadest aspects is therefore not limited to the specific details, implementations, or illustrative examples shown and described. Accordingly, departures may be made from such details without departing from the spirit or scope of applicant's general concept.

What is claimed is:

1. A drum brake apparatus for a vehicle air braking system, the drum brake apparatus comprising:
   a wheel drum having a first interior chamber;
   a drum brake assembly disposed in the first interior chamber of the wheel drum and mounted on inboard side of the wheel drum;
   a brake drum adapter mounted on outboard side of the wheel drum and providing a second interior chamber in which an electric drive motor can be disposed, wherein the brake drum adapter includes a tapered circumferential surface that extends between a larger radius edge on inboard side of the brake drum adapter and a smaller radius edge on outboard side of the brake drum adapter to form a substantially frustoconical shape of the brake drum adapter; and
   a wheel hub disposed in the second interior chamber of the brake drum adapter and to which a wheel rim can be mounted.

2. A drum brake apparatus according to claim 1, wherein (i) the wheel hub is disposed on outboard side of the second interior chamber of the brake drum adapter, and (ii) inboard side of the second interior chamber is provided for an electric drive motor.

3. A drum brake apparatus according to claim 1, wherein the first interior chamber of the wheel drum and the second interior chamber of the brake drum adapter are in communication with each other.

4. A drum brake apparatus according to claim 1, wherein (i) the wheel drum comprises cast iron material, and (ii) the brake drum adapter comprises cast aluminum material.

5. A drum brake apparatus according to claim 1, wherein the wheel drum has a longitudinal central axis and the brake drum adapter has a longitudinal central axis that is concentric with the longitudinal central axis of the wheel drum.

6. A drum brake apparatus according to claim 1, wherein the tapered circumferential surface has a plurality of vent openings through which air can pass to cool an electric drive motor.

7. A drum brake apparatus according to claim 1, wherein (i) the brake drum adapter includes an end surface disposed at the smaller radius edge and having a number of holes in the end surface, and (ii) the wheel hub includes a corresponding number of wheel studs extending through the holes in the end surface of the brake drum adapter and to which a wheel rim can be mounted.

8. A drum brake apparatus for a vehicle air braking system having an electric drive motor, the drum brake apparatus comprising:
   a wheel drum; and
   a brake drum adapter coupled with the wheel drum and cooperating with the wheel drum to form a structure that can house the electric drive motor, wherein the brake drum adapter includes a tapered circumferential surface that extends between a larger radius edge on inboard side of the brake drum adapter and a smaller radius edge on outboard side of the brake drum adapter to form a substantially frustoconical shape of the brake drum adapter.

9. A drum brake apparatus according to claim 8, wherein (i) the wheel drum comprises cast iron material, and (ii) the brake drum adapter comprises cast aluminum material.

10. A drum brake apparatus according to claim 8, wherein the wheel drum has a longitudinal central axis and the brake drum adapter has a longitudinal central axis that is concentric with the longitudinal central axis of the wheel drum.

11. A drum brake apparatus according to claim 8, wherein the tapered circumferential surface has a plurality of vent openings through which air can pass to cool brake components including the electric drive motor housed within the structure formed by the brake drum and the brake drum adapter.

12. A drum brake apparatus according to claim 8, wherein (i) the brake drum adapter includes an end surface disposed at the smaller radius edge and having a number of holes in the end surface through which wheel studs of a wheel hub can extend for mounting a wheel rim.

* * * * *